United States Patent
Shimizu et al.

(10) Patent No.: US 10,081,358 B2
(45) Date of Patent: Sep. 25, 2018

(54) LANE DEPARTURE PREVENTION APPARATUS

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Takahiro Shimizu, Kariya (JP); Hidenobu Kinugasa, Nagoya (JP); Yuji Okuda, Okazaki (JP)

(73) Assignees: DENSO CORPORATION, Kariya, Aichi-pref. (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/739,668

(22) PCT Filed: Jun. 20, 2016

(86) PCT No.: PCT/JP2016/068293
§ 371 (c)(1),
(2) Date: Dec. 22, 2017

(87) PCT Pub. No.: WO2016/208545
PCT Pub. Date: Dec. 29, 2016

(65) Prior Publication Data
US 2018/0186372 A1    Jul. 5, 2018

(30) Foreign Application Priority Data
Jun. 26, 2015   (JP) ................ 2015-129177

(51) Int. Cl.
*A01B 69/00*   (2006.01)
*B62D 6/00*    (2006.01)
(Continued)

(52) U.S. Cl.
CPC ............... *B60W 30/12* (2013.01); *B62D 6/08* (2013.01); *B60W 2510/202* (2013.01)

(58) Field of Classification Search
CPC .... B60W 30/12; B60W 2510/202; B62D 6/08
(Continued)

(56) References Cited

U.S. PATENT DOCUMENTS

| 6,154,695 A | 11/2000 | Shimizu et al. |
| 2016/0107645 A1 | 4/2016 | Okuda et al. |
| 2016/0176400 A1 | 6/2016 | Nakano et al. |

FOREIGN PATENT DOCUMENTS

| JP | 11078940 A | * | 3/1999 | ............ B62D 1/286 |
| JP | 11198839 A | * | 7/1999 | ............ B62D 1/286 |

(Continued)

*Primary Examiner* — Isaac G Smith
(74) *Attorney, Agent, or Firm* — Knobbe, Martens, Olson & Bear, LLP

(57) ABSTRACT

A lane departure prevention apparatus according to an embodiment includes a torque control section that outputs a torque control signal indicating to make an actuator generate automatic steering torque for preventing a vehicle from departing from a lane in which the vehicle is running; a driver steering torque detection section that detects driver steering torque, which is applied to a steering wheel of the vehicle by a driver; and a control stop determination section that determines whether or not the automatic steering torque is made zero by comparing a first cancel threshold value for determining sudden steering operation by the driver and a second cancel threshold value lower than the first cancel threshold value with the driver steering torque detected by the driver steering torque detection section. If the torque control section determines to make the automatic steering torque zero, the torque control section outputs the torque control signal so that the automatic steering torque is made zero with a predetermined torque change pattern. If the driver steering torque is the first cancel threshold value or (Continued)

more, the torque control section sets the torque change pattern to a pattern in which the automatic steering torque is promptly made zero. If the driver steering torque is less than the first cancel threshold and is equal to or more than the second cancel threshold, the torque control section sets the torque change pattern to a pattern in which the automatic steering torque is gradually decreased.

4 Claims, 5 Drawing Sheets

(51) Int. Cl.
    *B62D 11/00*     (2006.01)
    *B60W 30/12*     (2006.01)
    *B62D 6/08*     (2006.01)

(58) Field of Classification Search
    USPC .......................................... 701/41; 180/6.44
    See application file for complete search history.

(56) References Cited

FOREIGN PATENT DOCUMENTS

| | | |
|---|---|---|
| JP | H11-198839 | 7/1999 |
| JP | 2015-033942 | 2/2015 |

\* cited by examiner

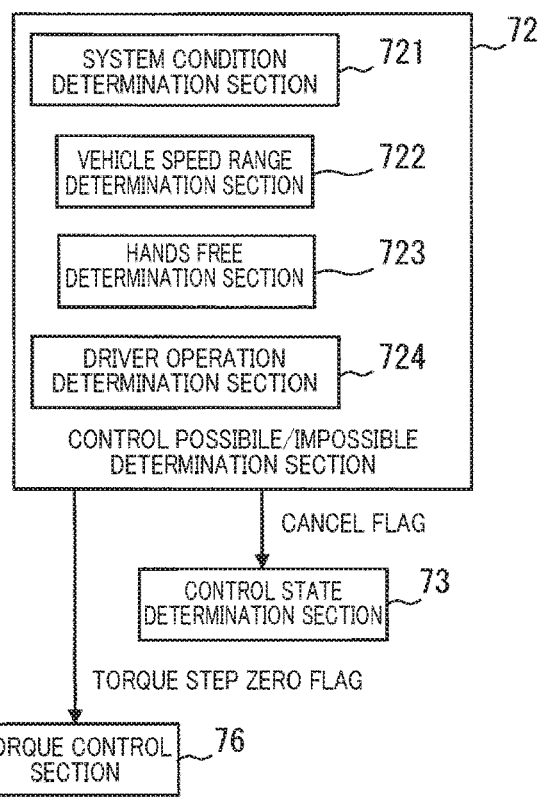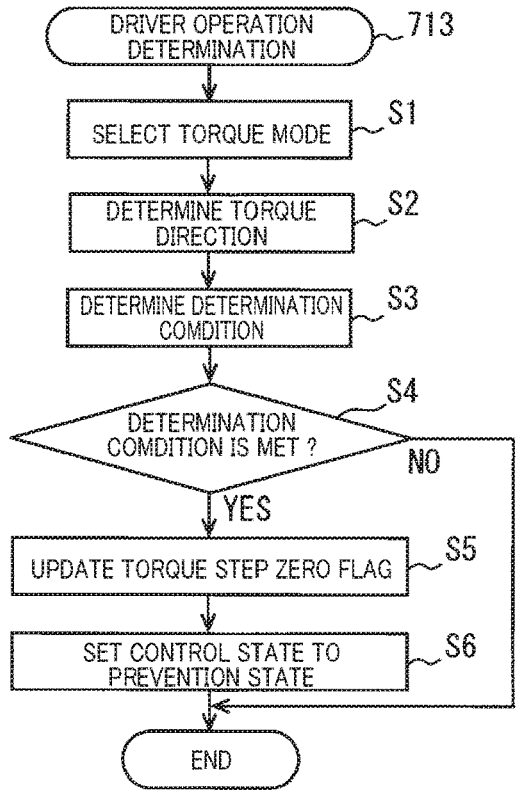

FIG.4

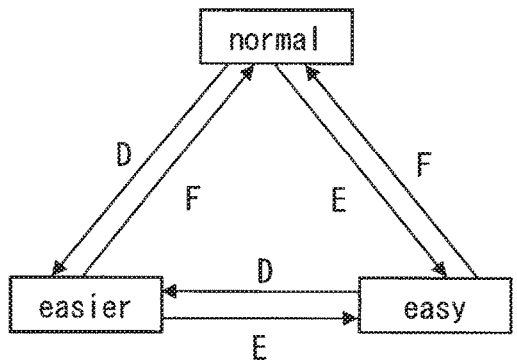

FIG.5

| | | DRIVER STEERING TORQUE | |
|---|---|---|---|
| | | IN-PHASE | ANTIPHASE |
| TORQUE MODE | normal | [CONDITION]<br>N4(Nm) OR MORE FOR P1(sec) OR MORE<br>[STATE]<br>· TORQUE STEP ZERO FLAG = on<br>· CONTROL STATE ≠ CONTROL | [CONDITION]<br>N3(Nm) OR MORE FOR P1(sec) OR MORE OR<br>N2(Nm) OR MORE FOR P2(sec) OR MORE OR<br>N1(Nm) OR MORE FOR P3(sec) OR MORE<br>[STATE]<br>· TORQUE STEP ZERO FLAG = off<br>· CONTROL STATE ≠ CONTROL |
| | easy | [CONDITION]<br>N4(Nm) OR MORE FOR P1(sec) OR MORE<br>[STATE]<br>· TORQUE STEP ZERO FLAG = on<br>· CONTROL STATE ≠ CONTROL | [CONDITION]<br>N1(Nm) OR MORE FOR P1(sec) OR MORE<br>[STATE]<br>· TORQUE STEP ZERO FLAG = off<br>· CONTROL STATE ≠ CONTROL |
| | easier | [CONDITION]<br>N4(Nm) OR MORE FOR P1(sec) OR MORE<br>[STATE]<br>· TORQUE STEP ZERO FLAG = on<br>· CONTROL STATE ≠ CONTROL | [CONDITION]<br>N1(Nm) OR MORE FOR P1(sec) OR MORE<br>[STATE]<br>· TORQUE STEP ZERO FLAG = off<br>· CONTROL STATE ≠ CONTROL |
| | COMMON TO ALL MODES | | [CONDITION]<br>N4(Nm) OR MORE FOR P1(sec) OR MORE<br>[STATE]<br>· TORQUE STEP ZERO FLAG = on<br>· CONTROL STATE ≠ CONTROL |

N1<N2<N3<N4
P1<P2<P3

LANE DEPARTURE PREVENTION APPARATUS

TECHNICAL FIELD

The present invention relates to a lane departure prevention apparatus that prevents a vehicle from departing from a lane in which the vehicle is running.

BACKGROUND ART

When determining that an own vehicle is likely to depart from a lane, a lane departure prevention apparatus controls the traveling direction of the own vehicle to prevent the own vehicle from departing from the lane. Apparatuses disclosed in Patent Literatures 1 and 2 control an actuator so as to generate torque rotating a steering shaft (hereinafter, referred to as automatic steering torque), in order to change the traveling direction of the own vehicle to prevent the own vehicle from departing from the lane.

In addition, in Patent Literature 1, when torque is applied to the steering shaft by steering operation of the driver (hereinafter, referred to as driver steering torque) while the actuator is generating automatic steering torque, the apparatus cancels the automatic steering torque under certain conditions.

For example, when driver steering torque is applied in a state where automatic steering torque is generated, a cancellation time or a cancellation torque integrated value is set based on the magnitude of the driver steering torque. Then, if the time period during which the driver steering torque is applied exceeds the cancellation time or the cancellation torque integrated value, outputting the automatic steering torque is stopped.

In addition, in Patent Literature 1, the cancellation time or the cancellation torque integrated value are changed depending on whether the direction of the automatic steering torque and the direction of the driver steering torque are the same or opposite to each other.

CITATION LIST

Patent Literature

[Patent Literature 1] JP-A-2015-20719
[Patent Literature 2] JP-A-2015-3566

SUMMARY OF THE INVENTION

Technical Problem

The apparatus disclosed in the Patent Literature 1 changes the cancellation time or the cancellation torque integrated value depending on whether the direction of the automatic steering torque and the direction of the driver steering torque are the same or opposite to each other. However, in both cases where the direction of the automatic steering torque and the direction of the driver steering torque are the same and where they are opposite to each other, if a cancellation condition is met, outputting the automatic steering torque is promptly stopped.

However, if outputting the automatic steering torque is promptly stopped, reaction force applied from the steering wheel operated by the driver suddenly changes. Thus, the driver may not have a good steering feeling.

Solution to Problem

An embodiment provides a lane departure prevention apparatus that provides a driver with a good feeling in steering operation.

A lane departure prevention apparatus according to an embodiment includes a torque control section that outputs a torque control signal indicating to make an actuator generate automatic steering torque for preventing a vehicle from departing from a lane in which the vehicle is running; a driver steering torque detection section that detects driver steering torque, which is applied to a steering wheel of the vehicle by a driver; and a control stop determination section that determines whether or not the automatic steering torque is made zero by comparing a first cancel threshold value for determining sudden steering operation by the driver and a second cancel threshold value lower than the first cancel threshold value with the driver steering torque detected by the driver steering torque detection section. If the torque control section determines to make the automatic steering torque zero, the torque control section outputs the torque control signal so that the automatic steering torque is made zero with a predetermined torque change pattern. If the driver steering torque is the first cancel threshold value or more, the torque control section sets the torque change pattern to a pattern in which the automatic steering torque is promptly made zero. If the driver steering torque is less than the first cancel threshold and is equal to or more than the second cancel threshold, the torque control section sets the torque change pattern to a pattern in which the automatic steering torque is gradually decreased.

BRIEF DESCRIPTION OF THE DRAWINGS

FIG. 2 is a diagram showing the configuration of a control possible/impossible determination section shown in FIG. 1 in detail;
FIG. 3 is a flowchart of a process performed by a driver operation determination section shown in FIG. 2;
FIG. 4 is a diagram showing a torque mode selected in step S1 in FIG. 3;
FIG. 5 is a diagram showing determination conditions determined in step S3 in FIG. 3.

DESCRIPTION OF THE EMBODIMENTS

First Embodiment

Figure 1:
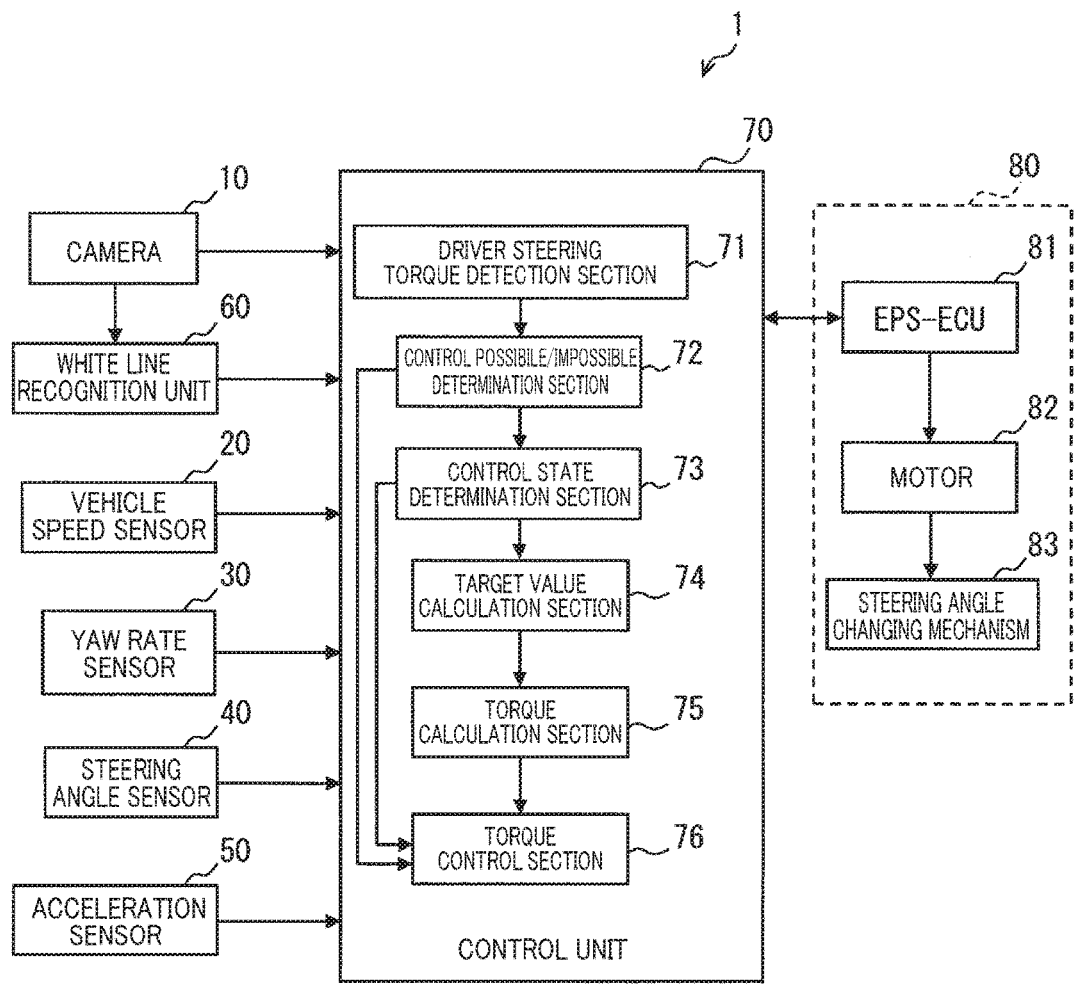
FIG. 1 is a diagram showing the whole configuration of a lane departure prevention system according to a first embodiment.

Hereinafter, the first embodiment will be described with reference to the drawings. As shown in FIG. 1, a lane departure prevention system 1 includes a camera 10, a vehicle speed sensor 20, a yaw rate sensor 30, a steering angle sensor 40, an acceleration sensor 50, a, and a control unit (lane departure control section) 70. The control unit 70 corresponds to a lane departure prevention apparatus. The lane departure prevention system 1 is installed in a vehicle, not shown, together with an electric power steering system 80. Hereinafter, the vehicle in which the lane departure prevention system 1 is installed is referred to as an own vehicle.

The camera 10 is fixed at a predetermined position so as to acquire images in a range ahead of and around the own vehicle. The range in which the camera 10 acquires images is a range in which images of lane markings can be acquired which partition lanes in which the own vehicle runs. The camera 10 may be a monocular camera or a compound eye camera. The camera 10 periodically acquires an image in an imaging range at a predetermined frame speed, and outputs image data representing the captured image to the white line recognition unit 60 and the control unit 70.

The vehicle speed sensor 20 detects a vehicle speed of the own vehicle and outputs the detected vehicle speed to the control unit 70.

The yaw rate sensor 30 detects a rotation angle speed around the vertical axis of the own vehicle, which passes through the yaw rate sensor 30, that is, a yaw rate, and outputs the detected yaw rate to the control unit 70.

The steering angle sensor 40 is a sensor that detects a steering angle of the own vehicle, and outputs the detected steering angle to the control unit 70.

The acceleration sensor 50 is a three-axis acceleration sensor and is fixed so that the z axis is parallel to the vertical direction of the vehicle, the y axis is parallel to the width direction of the vehicle, and the x axis is parallel to the longitudinal direction of the vehicle. It is noted that, instead of the three-axis acceleration sensor, a two-axis acceleration sensor may be used which detects acceleration along the x axis and y axis. Alternatively, an acceleration sensor may be used which detects only acceleration along the y axis. The acceleration sensor 50 sends detection values of acceleration along the axes to the control unit 70.

The white line recognition unit 60 recognizes lane markings from image data. The lane markings are road markings that partition driving lanes. The lane marking is a linear mark formed by linearly applying paint, which can be distinguished from a road surface, which is, for example, white, along the road. Alternatively, the lane markings may include objects such as cat's-eyes and lamps, which are arranged along a road and emit light, to partition driving lanes.

In addition, the white line recognition unit 60 calculates an angle between the lane marking and the traveling direction of the own vehicle based on the direction in which the lane marking extends in the image data. In addition, the white line recognition unit 60 also calculates a central position in the width direction (hereinafter, lateral position) of the own vehicle with reference to the center in the width direction of the driving lane in which the own vehicle runs.

The white line recognition unit 60 outputs recognition information including the position of the recognized lane marking, the angle between the lane marking and the traveling direction of the own vehicle, and the lateral position of the own vehicle, to the control unit 70.

The control unit 70 receives signals from the vehicle speed sensor 20, the yaw rate sensor 30, the steering angle sensor 40, the acceleration sensor 50, and the white line recognition unit 60. These signals may be received through an in-vehicle LAN, or directly and not through the in-vehicle LAN.

The control unit 70 is a computer including a CPU, a ROM, a RAM, and the like. The CPU uses a temporary storage function of the RAM to execute a program stored in a non-transitory tangible storage media such as the ROM. Hence, the control unit 70 functions as a driver steering torque detection section 71, a control possible/impossible determination section 72, a control state determination section 73, a target value calculation section 74, a torque calculation section 75, and a torque control section 76. The control unit 70 performs preprocessing such as filter processing for the input signals and uses the sections 71 to 76. It is noted that part of or all of the functions of the control unit 70 may be configured by hardware such as one or more ICs. Before the functions of the control unit 70 are described, the electric power steering system 80 will be described.

The electric power steering system 80 includes an EPS-ECU 81, a motor 82, and a steering angle changing mechanism 83. The EPS-ECU 81 controls the motor 82, which is an actuator rotating a steering shaft, to control a steering angle of the own vehicle. The EPS-ECU 81 receives a torque control signal from the control unit 70. The torque control signal represents automatic steering torque to be generated by the motor 82. The automatic steering torque rotates the steering shaft to prevent the own vehicle from departing from a lane in which the own vehicle is running.

When receiving the torque control signal, the EPS-ECU 81 controls a current flowing to the motor 82 so that the motor 82 generates automatic steering torque represented by the torque control signal. In addition, the EPS-ECU 81 acquires steering torque from a torque sensor, not shown, and outputs a signal representing the steering torque to the control unit 70. The torque sensor has a well-known configuration included in a well-known electric power steering system.

In addition, when the driver operates the steering wheel, the EPS-ECU 81 makes the motor 82 generate assist torque for reducing steering operation force.

The motor 82 generates the automatic steering torque and the assist torque. The motor 82 is connected to the steering shaft of the steering angle changing mechanism 83 or to a rotating shaft rotating with the steering shaft. The automatic steering torque and the assist torque rotate the rotating shaft.

The steering angle changing mechanism 83 is a mechanical mechanism that changes a steering angle, and has a known configuration including a rack shaft, the steering shaft, a rack gear, a pinion gear, a reduction gear, and the like.

(Functions of the Control Unit 70)

Next, functions of the control unit 70 will be described. The driver steering torque detection section 71 acquires steering torque from the EPS-ECU 81. Then, the driver steering torque detection section 71 periodically determines driver steering torque, which is input to the steering wheel by the driver, based on the steering torque.

Specifically, for example, when the motor 82 does not generate torque, the steering torque can be the driver steering torque without change. When the motor 82 generates torque, the torque generated by the motor 82 is subtracted from the steering torque. In addition, the driver steering torque may be appropriately determined by performing correction considering road surface input torque and the like. The torque generated by the motor 82 may be a measured value or automatic steering torque represented by the torque control signal output from the EPS-ECU 81.

The control possible/impossible determination section 72 determines whether or not the torque control section 76 can perform lane departure prevention control. Specifically, the lane departure prevention control means torque step zero control 761, normal torque control 762, and torque gradual decrease control 763 shown in FIG. 7. The contents of the above control will be described later.

If the control possible/impossible determination section 72 determines that the lane departure prevention control cannot be performed in the state where the control unit 70 is already outputting a torque control signal, the control possible/impossible determination section 72 determines to make the automatic steering torque zero, that is, to cancel the lane departure prevention control. Hence, the control possible/impossible determination section 72 corresponds to a control stop determination section.

As shown in FIG. 2, the control possible/impossible determination section 72 includes a system condition determination section 721, a vehicle speed range determination section 722, a hands free determination section 723, and a driver operation determination section 724.

The control possible/impossible determination section 72 updates a cancel flag representing a state where the lane departure prevention control can be performed or a state where the lane departure prevention control is prohibited from being performed, based on the determine results of the sections 721 to 724 shown in FIG. 2. In addition, when the lane departure prevention control ends, the control possible/impossible determination section 72 also updates a state of a torque zero step flag that represents which control is performed, control for decreasing the automatic steering torque with a zero step or control for gradually decreasing the automatic steering torque. Then, the control possible/impossible determination section 72 outputs the updated cancel flag to the control state determination section 73, and outputs the updated torque zero step flag to the torque control section 76.

The system condition determination section 721 determines whether or not components included in the lane departure prevention system 1 have suffered a failure. In this determination, presence or absence of a failure is determined by acquiring signals from the sensors. If the system condition determination section 721 determines that at least one failure is present in the components included in the lane departure prevention system 1, the control possible/impossible determination section 72 determines that the lane departure prevention control cannot be performed.

The vehicle speed range determination section 722 determines whether or not the vehicle speed of the own vehicle is within a preset control permission range. The control permission range may a range in which only a lower limit is defined. The lower limit of the control permission range is, for example, 50 km/h. In addition, the control permission range when control starts and the control permission range when control ends may be different from each other.

If the vehicle speed range determination section 722 determines that the vehicle speed of the own vehicle is within the control permission range, the control possible/impossible determination section 72 determines that the lane departure prevention control can be performed. If the vehicle speed range determination section 722 determines that the vehicle speed of the own vehicle is not within the control permission range, the control possible/impossible determination section 72 determines that the lane departure prevention control cannot be performed.

The hands free determination section 723 determines whether or not the hands of the driver are released from the steering wheel. This determination is made by using the driver steering torque detected by the driver steering torque detection section 71. When the state where the driver steering torque is a threshold or less has continued for a certain time period, the hands free determination section 723 determines that hands of the driver are released from the steering wheel.

If the hands free determination section 723 determines that hands of the driver are not released from the steering wheel, the control possible/impossible determination section 72 determines that the lane departure prevention control can be performed. If the hands free determination section 723 determines that hands of the driver are released from the steering wheel, the control possible/impossible determination section 72 determines that the lane departure prevention control cannot be performed.

The driver operation determination section 724 determines whether or not the driver is operating the own vehicle. If the driver operation determination section 724 determines that the driver is not operating the own vehicle, the control possible/impossible determination section 72 determines that the lane departure prevention control can be performed. If driver operation determination section 724 determines that the driver is operating the own vehicle, the control possible/impossible determination section 72 determines that the lane departure prevention control cannot be performed.

Whether the driver is operating the own vehicle is determined from, for example, whether or not the driver is operating the steering wheel. In addition, the driver operation determination section 724 determines whether or not the driver is operating the own vehicle from not only the steering operation but also brake operation, accelerator operation, and operation of direction indicators by the driver. If the brake operation, the accelerator operation, and the operation of direction indicators meet respective predetermined conditions including presence or absence of the operation and the operation amount equal to or more than a threshold value, the driver operation determination section 724 determines that the diver is operating the own vehicle.

Regarding the driver operation, the driver operation determination section 724 determines whether or not the driver is operating the own vehicle, based on the process shown in FIG. 3. First, in step S1, the driver operation determination section 724 selects a torque mode. As shown in FIG. 4, the torque mode includes three modes, that is, normal, easy, and easier. These modes are classified by ease of cancelling the automatic steering torque. Easier is the mode established in a situation in which cancelling the automatic steering torque is most allowable. Easy is the mode established in a situation in which cancelling the automatic steering torque is allowable next to easier.

The default is the normal mode. After the engine starts, if predetermined information including vehicle information such as steering torque, a steering angle, and a steering angle speed, and recognition information including a lane marking recognized by the white line recognition unit 60 can be received normally, an initial mode is set to the normal mode.

As shown in FIG. 4, the mode changes between normal, easy, and easier according to mode selection conditions D, E, and F. Under the mode selection condition D, the mode changes to easier. The mode selection condition D includes a condition D1 and a condition D2. The condition D1 is that the own vehicle is in a state where the own vehicle is returning from a maximum departure position in a target line calculated by a target value calculation section 74 described later to the center of the lane by the automatic steering torque. It is noted that the maximum departure position means a position at which the lateral position of the own vehicle is farthest from the center in the lane width direction. Whether the condition D1 is met is determined by the driver operation determination section 724 from the lateral position of the own vehicle and the angle between the lane marking and the traveling direction of the own vehicle, which are included in the recognition information acquired from the white line recognition unit 60.

The condition D2 is that the lateral position of the own vehicle is in the lane, the departure from the lane being to be prevented. Whether or not the condition D2 is met is also determined by the driver operation determination section 724 from the recognition information. If both the conditions D1 and D2 are met, the torque mode is set to easier.

The mode selection condition D is as described above, because when the mode selection condition D is met, the lane departure prevention control will soon end, and when the driver performs steering operation, the own vehicle is unlikely to depart from the lane even if the lane departure prevention control is cancelled. That is, the mode selection condition D is a condition for determining a probability that the own vehicle departs from the lane. If the mode selection condition D is met, since the probability that the own vehicle departs from the lane is low, a priority is given to the steering operation reflecting the intention of the driver.

Under the mode selection condition E, the mode changes to easy. The mode selection condition E includes conditions E1, E2, and E3. The condition E1 is a condition that the section in which the own vehicle is running is a construction site. To determine whether or not the condition is met, the driver operation determination section 724 analyzes image data acquired from the camera 10. If detecting a sign or the like indicating a construction site in the image data, the driver operation determination section 724 determines that the section in which the own vehicle is running is a construction site.

The condition E2 is a condition that another vehicle is present ahead of the own vehicle or in the lateral direction from the own vehicle. Whether or not this condition is met is also determined by analyzing the image data by the driver operation determination section 724. If another vehicle is detected in a predetermined area of the image data, the driver operation determination section 724 determines that another vehicle is present ahead of the own vehicle or in the lateral direction from the own vehicle.

The condition E3 is a condition that a fork is present ahead of the own vehicle. Whether or not this condition is met is determined by the driver operation determination section 724 from the recognition information acquired by the white line recognition unit 60. The driver operation determination section 724 determines that the condition E is met if any one of the conditions E1, E2, and E3 is met.

The mode selection condition E is as described above, because when the mode selection condition E is met, since the driver is highly likely to operate the steering wheel, the lane departure prevention control is necessary to promptly end when the driver has performed steering operation. That is, the mode selection condition E is a condition for determining a probability that the own vehicle makes a lane change.

Under the mode selection condition F, the mode changes to normal. The mode selection condition F is a condition that neither the mode selection condition D nor the mode selection condition E is met.

In step S1, if the driver operation determination section 724 selects a torque mode from among normal, easy, and easier, the process proceeds to step S2. In step S2, the driver operation determination section 724 determines whether the direction of the driver steering torque and the direction of the automatic steering torque are the same or opposed to each other. Hereinafter, the state in which the direction of the driver steering torque and the direction of the automatic steering torque are the same is referred to as an in-phase. The state in which the direction of the driver steering torque and the direction of the automatic steering torque are opposed to each other is referred to as an antiphase.

It is noted that if at least one of the driver steering torque and the automatic steering torque is zero, a predetermined in-phase or antiphase is set. Alternatively, if at least one of the driver steering torque and the automatic steering torque is zero, the process shown in FIG. 3 may be ended.

In step S3, the driver operation determination section 724 determines determination conditions for determining that the lane departure prevention control is canceled. The determination conditions are shown in FIG. 5. As shown in FIG. 5, the determination conditions are specified by the torque mode selected in step S1 and the torque direction determined in step S2. It is noted that, in FIG. 5, N1, N2, N3, and N4 are threshold values predetermined for the driver steering torque, and N1<N2<N3<N4 is established. In addition, P1, P2, and P3 are threshold values set for duration times during which the driver steering torque is a torque threshold value or more, and P1<P2<P3 is established. It is noted that P1 corresponds to a first cancellation time, and P2 and P3 correspond to second cancellation times.

The determination conditions regarding the in-phase are the same regardless of the torque modes. Regarding the antiphase, the conditions of easier and easy are the same, and the conditions of normal are more difficult to be met than those of easier and easy. Furthermore, regarding the antiphase, the same determination condition as that of the in-phase is provided as a determination condition common to all the modes.

The torque threshold value N4 of the determination condition common to all the modes and the determination condition regarding the in-phase is set to a value that is not exceeded without sudden steering operation by the driver. The torque threshold value N4 corresponds to a first cancellation threshold value. The magnitude of the torque threshold value N4 is determined based on experiments. In addition, the torque threshold values N1, N2, and N3 smaller than the torque threshold value N4 correspond to second cancellation values.

In step S4, the driver operation determination section 724 determines whether or not the driver steering torque detected by the driver steering torque detection section 71 meets the determination condition determined in step S3. In addition, in this step S4, the driver operation determination section 724 determines whether or not determination conditions for a steering angle and a steering angle speed are met. The determination conditions for a steering angle and a steering angle speed are that whether the steering angle and the steering angle speed have exceeded respective preset threshold values. If the determination in step S4 is NO, the process shown in FIG. 3 is ended. In contrast, if the determination in step S4 is YES, the process proceeds to step S5.

In step S5, the driver operation determination section 724 updates the torque step zero flag so as to correspond to the met determination condition. In the determination conditions shown in FIG. 5, corresponding states of the torque step zero flag are also shown.

As shown in FIG. 5, if the determination condition regarding the in-phase and common to all the modes of the antiphase is met, the driver operation determination section 724 sets the torque step zero flag to an on state. The torque step zero flag means that, when the lane departure prevention control is ended, the automatic steering torque is made zero with a zero step, that is, the automatic steering torque is promptly made zero.

If the determination condition regarding the in-phase and common to all the modes of the antiphase is met, the torque step zero flag is set to an on state, because the torque threshold value N4 set in the determination condition is not exceed without sudden steering operation. When the driver performs a sudden steering operation, the driver probably wishes that the steering angle changes promptly in response to the steering operation thereby. Hence, the torque zero step flag is set to an on state.

Meanwhile, when the determination conditions of normal, easy, and easier of the antiphase are set, if the determination condition are met, the driver operation determination section 724 sets the torque step zero flag to an off state. When the torque step zero flag is in an off state, the automatic steering torque is gradually decreased when the lane departure prevention control is ended.

In the situation in which the determination conditions of normal, easy, and easier of the antiphase are met, although the driver is operating the steering wheel, the steering operation is not so suddenly performed. In addition, in the state where the driver is operating the steering wheel, the driver senses the magnitude of the automatic steering torque from reaction force applied from the steering wheel.

When not suddenly performing steering operation, the driver can afford to sense a change in the automatic steering torque. Hence, if the automatic steering torque suddenly becomes zero, the driver has a feeling of strangeness in steering operation. Hence, in the situation in which the determination conditions of normal, easy, and easier of the antiphase are met, the automatic steering torque is gradually decreased when the lane departure prevention control is ended. If the automatic steering torque is gradually decreased, the change in the automatic steering torque is difficult to be sensed compared with a case where the automatic steering torque is promptly made zero. Thus, the driver has a good feeling in steering operation.

In step S6, when any of the determination conditions is met, the driver operation determination section 724 sets the control state to a prevention state. If the steering angle meets the determination condition, even when the steering angle meets the determination condition, the driver operation determination section 724 sets the control state to a prevention state.

When it is determined that one of the system condition determination section 721, the vehicle speed range determination section 722, the hands free determination section 723, and the driver operation determination section 72 cannot perform the lane departure prevention control, or when the control state is set to a prevention state, the control possible/impossible determination section 72 sets the cancel flag to a value representing a state in which the lane departure prevention control is prevented from being performed. In addition, the control possible/impossible determination section 72 outputs the torque step zero flag to the torque control section 76 as a value determined based on the determination results of the sections 721 to 724.

Figure 6:
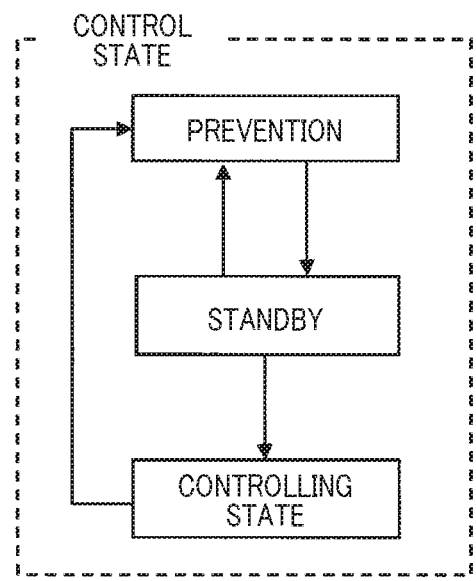
FIG. 6 is a diagram showing a control state determined by a control state determination section shown in FIG. 1.

The description returns to FIG. 1. The control state determination section 73 selects one of the three control states shown in FIG. 6 to determine a current control state. As shown in FIG. 6, the control state includes the prevention state, a standby state, and a controlling state.

In the standby state, although the lane departure prevention control is allowed to be performed, the lane departure prevention control is not being performed. In the controlling state, the lane departure prevention control is being performed. In the prevention state, the lane departure prevention control is prohibited from being performed. When the state is changed from the controlling state to the prevention state, the lane departure prevention control is ended. The control state is determined for each of the lane departure prevention control for preventing the vehicle from departing in the right direction from a lane and the lane departure prevention control for preventing the vehicle from departing in the left direction from the lane.

When step S6 described above is performed, the control state is set to the prevention state. In addition, the condition for changing the control state from the standby state to the prevention state includes a case where when an operation of the driver is detected in the standby state, a lane marking cannot be recognized. In contrast, if the condition for changing the control state from the standby state to the prevention state is not met in the prevention state, the standby state is set.

In the prevention state, if it is determined that the own vehicle is likely to depart from the lane in which the own vehicle is running at present, the control state changes to the controlling state.

The condition for determining that the own vehicle is likely to depart from the lane in which the own vehicle is running at present is, for example, as below. When a lateral distance d from the own vehicle to the lane marking is shorter than a distance threshold value THd, and when the front face of the own vehicle faces to the lane marking, it is determined that the own vehicle is likely to depart from the lane.

In the above determination, the lateral position of the own vehicle for calculating the lateral distance d from the own vehicle to the lane marking is set to a position of the end of the axle shaft of the front wheels at the lane marking side. The distance in the lane width direction from this position to the boundary of the lane marking at the own vehicle side is defined as the lateral distance d.

Whether or not the front face of the own vehicle faces to the lane marking is determined from the direction in which the lane marking recognized by the white line recognition unit 60 extends. Since the direction in which the lane marking recognized by the white line recognition unit 60 extends corresponds to the direction in which the lane marking extends with respect to the direction of the own vehicle, it is determined whether or not the front face of the own vehicle faces to the lane marking.

In addition, a departure prediction time until the position of the own vehicle agrees with the lane marking may be calculated. If the departure prediction time becomes a time threshold value THt or less, it may be determined that the own vehicle is likely to depart from the lane.

The departure prediction time is calculated by dividing the lateral distance d from the own vehicle to the lane marking by a lateral speed Vy. The lateral speed Vy of the own vehicle is calculated from the variation of the lateral distance d with time. In addition, the lateral speed Vy may be calculated by integrating the detection value on the y axis obtained from the acceleration sensor 50, that is, lateral direction acceleration.

When the control state determination section 73 changes the control state to the controlling state, the target value calculation section 74 determines a target line and a target steering angle to perform the lane departure prevention control.

The target line can be set by using various known methods. For example, the method disclosed in the Patent Literature 2 can be used. In the Patent Literature 2, the curvature obtained by adding a predetermined value to the curvature of the lane marking is defined as a first target line for preventing the departure. In addition, the curvature smaller than the first target line is set as a second target line, which is a target line for making the traveling direction of the own vehicle be along the lane after the departure is prevented.

The target steering angle is a steering angle to be controlled so that the own vehicle runs along the target line. The target steering angle is determined by using, in addition to the target line, an actual steering angle detected by the steering angle sensor 40 and a yaw rate detected by the yaw rate sensor 30. Since a method of determining a target steering angle is also known, further description thereof is omitted.

The torque calculation section 75 determines the automatic steering torque so as to be the target steering angle calculated by the target value calculation section 74. Then, the torque calculation section 75 outputs the determined automatic steering torque to the torque control section 76.

The torque control section 76 acquires the automatic steering torque determined by the torque calculation section 75, acquires the latest control state from the control state determination section 73, and acquires a torque step zero flag from the control possible/impossible determination section 72. Then, the torque control section 76 determines the control to be performed among those shown in FIG. 7 from the control state and the state of the torque step zero flag.

Figure 7:
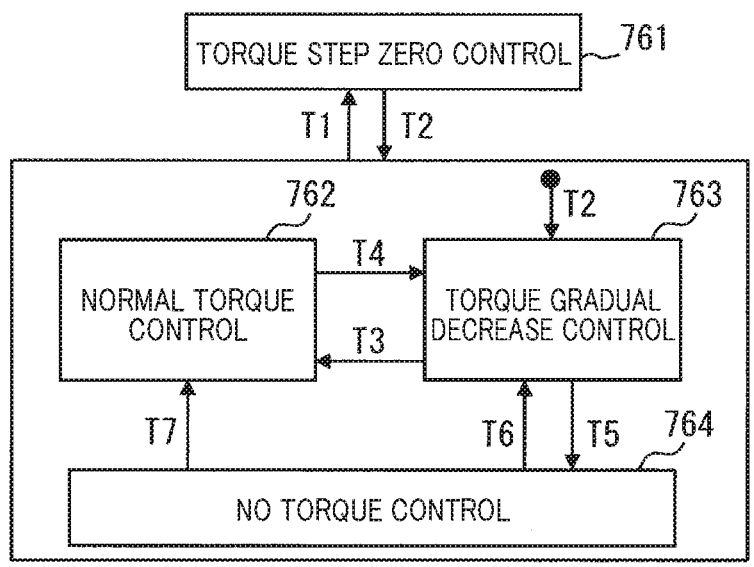
FIG. 7 is a diagram showing control performed by a torque control section shown in FIG. 1.

FIG. 7 shows four types of control, the torque step zero control 761, the normal torque control 762, the torque gradual decrease control 763, and no torque control 764. The torque step zero control 761 decreases the automatic steering torque with a zero step. The zero step is a torque change pattern in which the automatic steering torque is promptly made zero. The normal torque control 762 makes the motor 82 generate the automatic steering torque calculated by the torque calculation section 75. The torque gradual decrease control 763 decreases the automatic steering torque to zero with the torque change pattern in which torque is decreased at a predetermined gradually decreasing inclination α1 (Nm/s). Although an initial value of the gradually decreasing inclination α1 is set, the value thereof can be changed. The no torque control 764 maintains a state where the automatic steering torque is not output.

Which control is performed among the control 761 to 764 is determined by using torque arbitration conditions T1 to T7 shown in FIG. 7.

The torque adjustment condition T1 is a condition that the torque step zero flag is in an on state. If the torque adjustment condition T1 is met, in the state where the control other than the torque step zero control 761, that is, any of the normal torque control 762, the torque gradual decrease control 763, and the no torque control 764, is set, the torque step zero control 761 is set as the control performed by the torque control section 76.

The torque adjustment condition T2 is a condition that the torque step zero flag is not in an on state, that is, the torque step zero flag is in an off state. If the torque adjustment condition T2 is met in a state where the torque step zero control 761 is selected, the torque gradual decrease control 763 is set.

The torque adjustment condition T3 is a condition that the torque step zero flag is in an off state, and the control state is the controlling state. The torque adjustment condition T4 is a condition that the torque step zero flag is in an off state, and the control state is the prevention state. The torque adjustment condition T5 is a condition that the torque step zero flag is in an off state, and the control state is the standby state.

The torque adjustment condition T6 is a condition that the torque step zero flag is in an off state, and the control state is the prevention state. The torque adjustment condition T7 is a condition that the torque step zero flag is in an off state, and the control state is the controlling state.

The torque control section 76 performs the control determined from among the torque step zero control 761, the normal torque control 762, the torque gradual decrease control 763, and the no torque control 764, based on the torque adjustment conditions T1 to T7. Then, the torque control section 76 outputs a torque control signal indicating the automatic steering torque determined depending on the determined control to the EPS-ECU 81.

In this case, the torque gradual decrease control 763 is performed when any of the torque adjustment conditions T2, T4, and T6 is met. Each of the torque adjustment conditions T2, T4, and T6 includes a condition that the torque step zero flag is in an off state.

As describe with reference to FIG. 5, the torque step zero flag becomes an off state when the torque direction is an antiphase and when particular determination conditions are met which are determination conditions other than the determination condition common to all the modes. All the particular determination conditions in the case where the torque direction is an antiphase are met when the driver steering torque is smaller than the torque threshold value N4 and is equal to or more than any of the torque threshold values N1 to N3.

Thus, the torque gradual decrease control 763 is performed when the driver steering torque is smaller than the torque threshold value N4 and is equal to or more than any of the torque threshold values N1 to N3.

Effects of First Embodiment

In the present embodiment, if the determination condition including the torque threshold value N4 for determining sudden steering operation by the driver is met, the control possible/impossible determination section 72 sets the torque step zero flag to an on state (S5), and sets the control state to a prevention state (S6). If the torque step zero flag is in an on state, the torque control section 76 performs the torque step zero control 761, and outputs a torque control signal representing a torque change pattern in which the automatic steering torque is promptly made zero.

Hence, when the driver suddenly performs steering operation, the steering angle changes promptly in response to the steering operation by the driver. Thus, the driver has good steering feeling.

Meanwhile, if the determination condition including the torque threshold values N1, N2, and N3, which are smaller than the torque threshold value N4, is met, the control possible/impossible determination section 72 sets the torque step zero flag to an off state (S5), and sets the control state to a prevention state (S6). If the torque step zero flag is in an off state, and the control state is a prevention state, the torque control section 76 performs the torque gradual decrease control 763 to output a torque control signal so that the automatic steering torque decreases with the predetermined gradually decreasing inclination α1. Hence, since the reaction force applied from the steering wheel to the driver is prevented from suddenly changing, the driver has good steering feeling even when the steering operation is not suddenly performed by the driver.

In addition, in the present embodiment, if the direction of the driver steering torque and the direction of the automatic steering torque are in an in-phase, the torque threshold value included in the determination condition is only the torque threshold value N4 for determining sudden steering operation by the driver. Hence, if the direction of the driver steering torque and the direction of the automatic steering torque are in an in-phase, the automatic steering torque is cancelled only when the driver has performed sudden steering operation. Hence, cancelling the automatic steering torque more than necessary can be prevented.

In contrast, if the direction of the driver steering torque and the direction of the automatic steering torque are in an antiphase, the determination condition includes, in addition to the torque threshold value N4, at least the torque threshold value N1. The torque threshold value N1 is smaller than the torque threshold value N4. Hence, if the direction of the driver steering torque and the direction of the automatic steering torque are in an antiphase, even when the driver steering torque is relatively small, the automatic steering torque is cancelled.

If the direction of the driver steering torque and the direction of the automatic steering torque are in an antiphase, the driver has a strong feeling of strangeness due to the generated automatic steering torque. However, in the present embodiment, if the direction of the driver steering torque and the direction of the automatic steering torque are in an antiphase, even when the driver steering torque is relatively small, the automatic steering torque is cancelled. Hence, the driver has good steering feeling.

In addition, in the present embodiment, one torque mode is selected from among three torque modes classified by ease of cancelling the automatic steering torque (S1). When a torque mode is selected, the mode selection condition D for determining the probability that the own vehicle departs from the lane and the mode selection condition E for determining the probability that the own vehicle makes a lane change are used. Then, the determination condition is determined depending on the selected torque mode (S3), and it is determined whether or not the determination condition is met (S4). Hence, it can be determined whether or not the automatic steering torque is to be cancelled depending on the probability that the own vehicle departs from the lane and the probability that the own vehicle makes a lane change. Hence, the automatic steering torque can be canceled in an appropriate situation. Even in this case, the driver has good steering feeling.

Second Embodiment

Next, the second embodiment will be described. In the following description, an element having the same sign as that previously used is the same as the element having the same sign as that used in the previous embodiment, except for a case where specific reference is made. In addition, when only a part of a configuration is described, the previously described embodiment can be applied to other parts of the configuration.

Figure 8:
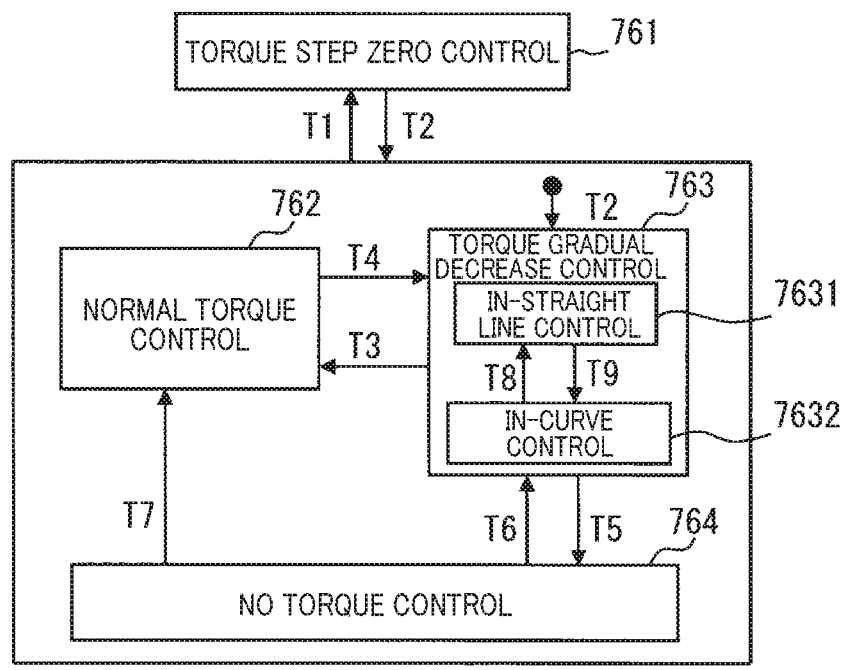
FIG. 8 is a diagram showing control performed by a torque control section according to a second embodiment.

In the second embodiment, the torque control section 76 performs the control shown in FIG. 8 instead of the control shown in FIG. 7. Differences between FIG. 7 and FIG. 8 are in that the torque gradual decrease control 763 is divided into two, that is, in-straight line control 7631 and in-curve control 7632, and that the torque gradual decrease control 763 includes torque adjustment conditions T8 and T9 according to the division.

Both the in-straight line control 7631 and the in-curve control 7632 gradually decrease the automatic steering torque to zero. The difference between them is in an inclination gradually decreasing the automatic steering torque. If the inclination gradually decreasing the automatic steering torque is set to $\alpha 2$ (Nm/s) in the in-straight line control 7631 and to $\alpha 3$ (Nm/s) in the in-curve control 7632, $\alpha 2 < \alpha 3$ is established. It is noted that $\alpha 2$ may be the same as $\alpha 1$ or differ from $\alpha 1$.

The torque adjustment condition T8 is a condition that the torque step zero flag is in an off state, the control state is the prevention state, and the road on which the vehicle is running is a straight road. Whether the road on which the vehicle is running is a straight road is determined from the shape of a lane marking acquired from the white line recognition unit 60. For example, if the curvature of the lane marking is 1/3000 or less, the road on which the vehicle is running is determined as a straight road.

The torque adjustment condition T9 is a condition that the torque step zero flag is in an off state, the control state is the prevention state, and the road on which the vehicle is running is a curved road. If the road on which the vehicle is running does not meet the condition concerning the straight road described above, the road on which the vehicle is running is determined as a curved road.

Since $\alpha 2 < \alpha 3$ is established, the in-straight line control 7631 makes the automatic steering torque zero with relatively long time.

That is, in the second embodiment, even when the automatic steering torque is gradually decreased, if it is determined that the own vehicle is running on a straight road, the automatic steering torque is decreased more gradually compared with the case where it is determined that the own vehicle is running on a curved road. In other words, if it is determined that the own vehicle is running on a curved road, the automatic steering torque is decreased steeply compared with the case where it is determined that the own vehicle is running on a straight road.

To run the own vehicle along on curved road, the steering angle is required not to be zero. Hence, the reaction force sensed by the driver from the steering wheel during steering operation is large compared with the case where the own vehicle is running on a straight road.

Hence, when the own vehicle is running on a curved road, it is difficult for the driver to sense the change in the automatic steering torque caused during steering operation. In other words, when the own vehicle is running on a straight road, the driver easily senses the change in the automatic steering torque due to the reaction force applied from the steering wheel compared with the case where the own vehicle is running on a curved road.

Hence, in the second embodiment, the inclination gradually decreasing the automatic steering torque is changed based on whether the road on which the own vehicle is running is a straight road or a curved road. Hence, in both the cases where the road on which the own vehicle is running is a straight road and the curved road, the driver has a good feeling in steering operation during the automatic steering torque is gradually decreased.

Hereinbefore, embodiments of the present invention are described. However, the present invention is not limited to the embodiments described above. The following modification is also included in the technical scope of the present invention. Furthermore, the present invention can be implemented with various changes within a range not departing from the spirit.

<Modification 1>

For example, in the embodiments described above, the torque mode is divided into three modes. Since the determination conditions of easy and easier are the same, the torque mode is substantially divided into two modes. However, the torque mode may be divided into three or more modes whose determination conditions substantially differ from one another.

A lane departure prevention apparatus according to an embodiment includes a torque control section (76) that outputs a torque control signal indicating to make an actuator generate automatic steering torque for preventing a vehicle from departing from a lane in which the vehicle is running; a driver steering torque detection section (71) that detects driver steering torque, which is applied to a steering wheel of the vehicle by a driver; and a control stop determination section (72) that determines whether or not the automatic steering torque is made zero by comparing a first cancel threshold value for determining sudden steering operation by the driver and a second cancel threshold value lower than the first cancel threshold value with the driver steering torque detected by the driver steering torque detection section. If the torque control section determines to make the automatic steering torque zero, the torque control section outputs the torque control signal so that the automatic steering torque is made zero with a predetermined torque change pattern. If the driver steering torque is the first cancel threshold value or more, the torque control section sets the torque change pattern to a pattern in which the automatic steering torque is promptly made zero. If the driver steering torque is less than the first cancel threshold and is equal to or more than the second cancel threshold, the torque control section sets the torque change pattern to a pattern in which the automatic steering torque is gradually decreased.

When the driver suddenly performs steering operation, the driver should wish that the steering angle changes promptly in response to the steering operation. In the present embodiment, if the driver steering torque is equal to or more than the first cancel threshold value for determining sudden steering operation by the driver, the torque control signal of the torque change pattern in which the automatic steering torque is promptly made zero is output. Thereby, when the driver suddenly performs steering operation, the steering angle changes promptly in response to the steering operation by the driver. Hence, the driver has good steering feeling when the steering operation is suddenly performed by the driver.

In addition, according to the present embodiment, even if the driver steering torque is not equal to or more the first cancellation threshold value and is equal to or more the second cancellation threshold value, the automatic steering torque is made zero. That is, even when the driver does not suddenly perform steering operation, when the driver operates the steering wheel to some extent, the automatic steering torque is made zero, and the steering operation is left to the driver.

However, when the driver does not suddenly perform steering operation, the automatic steering torque is gradually decreased. Thereby, the reaction force applied from the steering wheel to the driver is prevented from suddenly changing. Hence, the driver has good steering feeling even when the steering operation is not suddenly performed by the driver.

REFERENCE SIGNS LIST

1: lane departure prevention system
10: camera
20: vehicle sensor
30: yaw rate sensor
40: steering angle sensor
50: acceleration sensor
60: white line recognition unit
70: control unit
71: driver steering torque detection section
72: control possible/impossible determination section
73: control state determination section
80: electric power steering system
81: EPS-ECU
82: motor
83: steering angle changing mechanism

The invention claimed is:

1. A lane departure prevention apparatus characterized by comprising:
   a torque control section that outputs a torque control signal indicating to make an actuator generate automatic steering torque for preventing a vehicle from departing from a lane in which the vehicle is running;
   a driver steering torque detection section that detects driver steering torque, which is applied to a steering wheel of the vehicle by a driver; and
   a control stop determination section that determines whether or not the automatic steering torque is made zero by comparing a first cancel threshold value for determining sudden steering operation by the driver and a second cancel threshold value lower than the first cancel threshold value with the driver steering torque detected by the driver steering torque detection section, wherein
   if the torque control section determines to make the automatic steering torque zero, the torque control section outputs the torque control signal so that the automatic steering torque is made zero with a predetermined torque change pattern,
   if the driver steering torque is the first cancel threshold value or more, the torque control section sets the torque change pattern to a pattern in which the automatic steering torque is promptly made zero, and
   if the driver steering torque is less than the first cancel threshold and is equal to or more than the second cancel threshold, the torque control section sets the torque change pattern to a pattern in which the automatic steering torque is gradually decreased,
   when the torque change pattern is set to the pattern in which the automatic steering torque is gradually decreased, and if it is determined that the vehicle is running on a straight road, the torque control section sets the torque change pattern to a pattern in which the automatic steering torque is decreased more gradually compared with a case where it is determined that the vehicle is running in a curved road.

2. The lane departure prevention apparatus according to claim 1, characterized in that
   if the direction of the driver steering torque and the direction of the automatic steering torque are the same, the control stop determination section determines whether or not the automatic steering torque is made zero by comparing the first cancel threshold with the driver steering torque, and
   if the direction of the driver steering torque and the direction of the automatic steering torque are opposed to each other, the control stop determination section determines whether or not the automatic steering torque is made zero by comparing the first cancel threshold and the second cancel threshold with the driver steering torque.

3. The lane departure prevention apparatus according to claim 2, characterized in that the control stop determination section determines whether or not the automatic steering torque is made zero based on whether or not a time during which the driver steering torque exceeds the first cancel threshold value has exceeded a preset first cancel time and whether or not a time during which the driver steering torque exceeds the second cancel threshold value has exceeded a preset second cancel time, the control stop determination section selects one mode from among a plurality modes that have individual ease of cancelling the automatic steering torque, based on a preset mode selection condition for determining at least one of a probability that the vehicle departs from the lane and a probability that own vehicle makes a lane change, and if the selected mode is a mode in which cancelling the automatic steering torque is relatively easy, the control stop determination section sets at least one of the second cancel threshold value and the second cancel time to a value by which the determination that the automatic steering torque is made zero is likely to be made compared with a mode in which cancelling the automatic steering torque is not relatively easy.

4. A lane departure prevention apparatus characterized by comprising:

a torque control section that outputs a torque control signal indicating to make an actuator generate automatic steering torque for preventing a vehicle from departing from a lane in which the vehicle is running;

a driver steering torque detection section that detects driver steering torque, which is applied to a steering wheel of the vehicle by a driver; and a control stop determination section that determines whether or not the automatic steering torque is made zero by comparing a first cancel threshold value for determining sudden steering operation by the driver and a second cancel threshold value lower than the first cancel threshold value with the driver steering torque detected by the driver steering torque detection section, wherein if the torque control section determines to make the automatic steering torque zero, the torque control section outputs the torque control signal so that the automatic steering torque is made zero with a predetermined torque change pattern, if the driver steering torque is the first cancel threshold value or more, the torque control section sets the torque change pattern to a pattern in which the automatic steering torque is promptly made zero, if the driver steering torque is less than the first cancel threshold and is equal to or more than the second cancel threshold, the torque control section sets the torque change pattern to a pattern in which the automatic steering torque is gradually decreased, if the direction of the driver steering torque and the direction of the automatic steering torque are the same, the control stop determination section determines whether or not the automatic steering torque is made zero by comparing the first cancel threshold with the driver steering torque, if the direction of the driver steering torque and the direction of the automatic steering torque are opposed to each other, the control stop determination section determines whether or not the automatic steering torque is made zero by comparing the first cancel threshold and the second cancel threshold with the driver steering torque, the control stop determination section determines whether or not the automatic steering torque is made zero based on whether or not a time during which the driver steering torque exceeds the first cancel threshold value has exceeded a preset first cancel time and whether or not a time during which the driver steering torque exceeds the second cancel threshold value has exceeded a preset second cancel time, the control stop determination section selects one mode from among a plurality modes that have individual ease of cancelling the automatic steering torque, based on a preset mode selection condition for determining at least one of a probability that the vehicle departs from the lane and a probability that own vehicle makes a lane change, and if the selected mode is a mode in which cancelling the automatic steering torque is relatively easy, the control stop determination section sets at least one of the second cancel threshold value and the second cancel time to a value by which the determination that the automatic steering torque is made zero is likely to be made compared with a mode in which cancelling the automatic steering torque is not relatively easy.

* * * * *